Aug. 8, 1933.  A. D. MacLEAN ET AL  1,921,365
PRESSURE REGULATOR
Filed Dec. 16, 1929  2 Sheets-Sheet 1
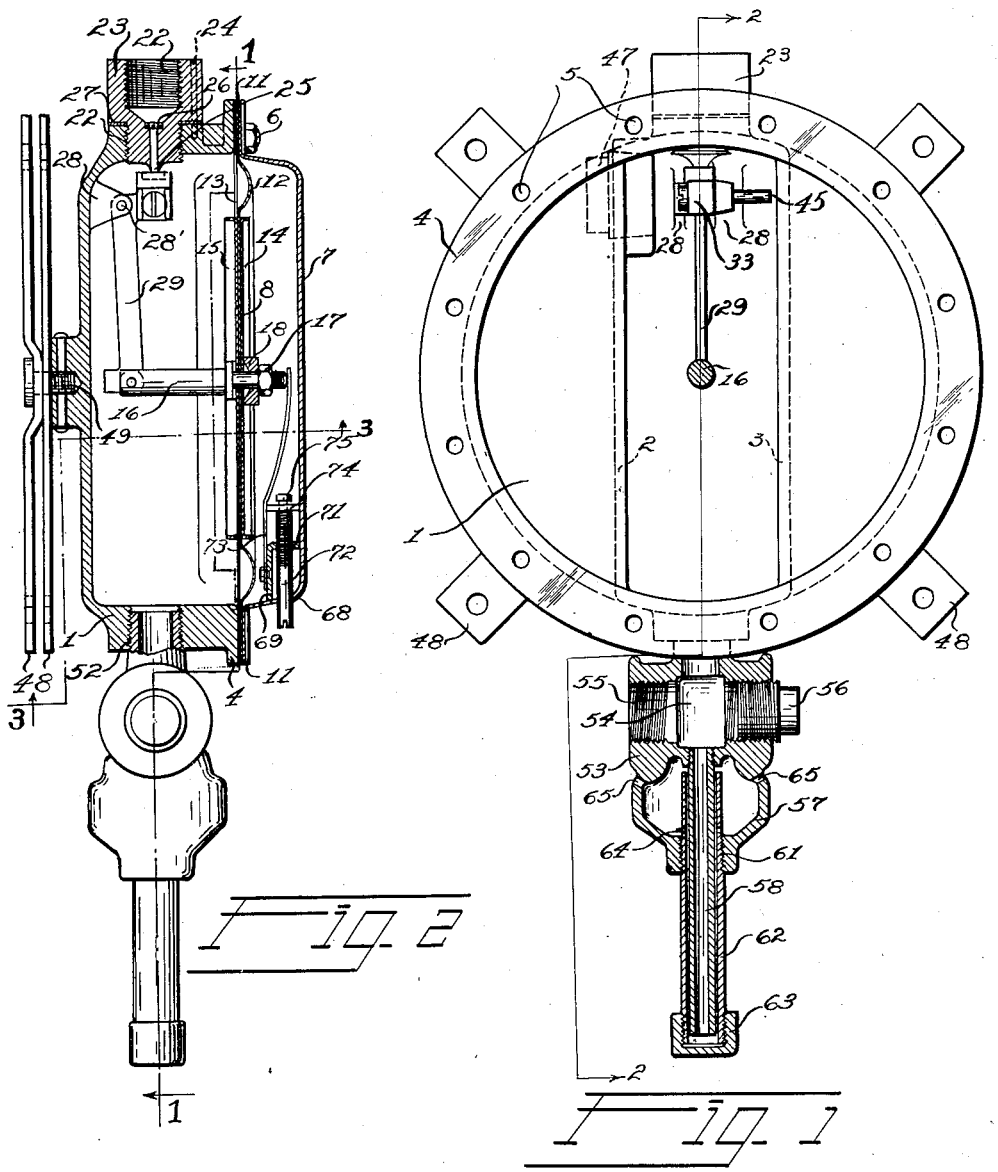
Inventors
Allen D. MacLean
Chas. B. Johnson
By Strauch & Hoffman
Attorneys

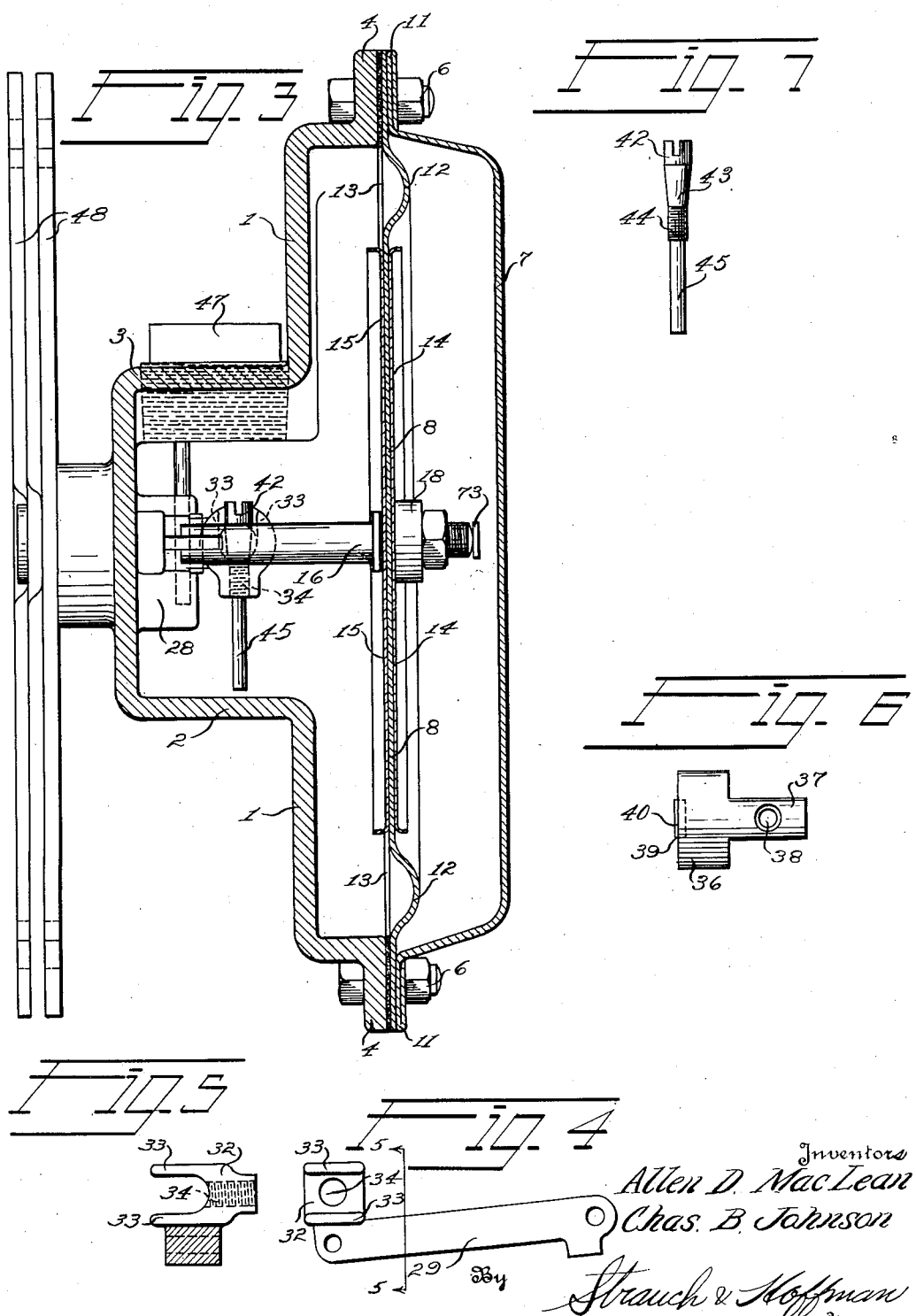

Patented Aug. 8, 1933

1,921,365

UNITED STATES PATENT OFFICE 1,921,365

PRESSURE REGULATOR

Allen D. MacLean and Charles B. Johnson, Pittsburgh, Pa., assignors to Pittsburgh Equitable Meter Company, Pittsburgh, Pa., a Corporation of Pennsylvania Application December 16, 1929. Serial No. 414,507

11 Claims. (Cl. 50—26)

This invention relates to a pressure regulator, and although not limited thereto, is particularly adapted for use with bottled gas containers in order to provide even and uniform pressure in the low pressure mains.

In rural communities where there is no central gas plant with pipes connecting the individual houses for gas service, it is quite common today to provide bottled gas containers, which containers are filled with the gas for illuminating and heating purposes under high pressures. These bottled gas containers are positioned in the various houses to be serviced and are connected to the low pressure pipe line in the houses. It is of course necessary to provide pressure reducing means within the line positioned between the containers and the low pressure main, such pressure regulators being adapted to give an even, constant supply of gas at low pressure.

A pressure regulator adapted for the above noted service must be extremely durable in use since they are usually positioned in communities where servicing of the pressure regulators cannot be had quickly and the accuracy of the regulator must be maintained under all service conditions.

It is an object of this invention, therefore, to provide a pressure regulator particularly adapted for use with bottled gas containers which is simple and easy to construct, extremely durable in use, and which can be readily serviced by a workman.

Another object of this invention is to provide a pressure regulator in which the adjustment of the diaphragm and therefore the pressure in the low pressure main can be simply and expeditiously accomplished by an unskilled workman.

Another object of this invention is to provide a pressure regulator for use with bottled gas containers having associated therewith a mercury seal as a safety device also serving as the regulator outlet connection, with means whereby the pressure regulator and the mercury seal may be adapted for use with a plurality of low pressure mains, so that one regulator and seal will suffice for a plurality of low pressure conduits. More specifically, it is a further object of this invention to provide a regulator as above described which is readily convertible for use with one or a plurality of low pressure mains.

In pressure regulators of this type as usually provided there is a hard metal seat and a hard metal valve cooperating therewith, usually made of bronze or brass. After a comparatively short period of use it is usually necessary to either renew the valve and the seat or to regrind the same to provide the proper seating of the valve. In prior regulators it has been necessary to disassemble the entire regulator to remove the valve and seat in order to replace or repair the same.

A further object of this invention, therefore, is to provide a regulator contained within a closed casing, the valve and the valve seat being detachably secured to the remaining structure, and wherein the casing is provided with a normally closed opening through which the entire valve may be removed from the casing after being detached.

A further object of the invention is to provide a removable and replaceable valve for regulators in which the valve is secured to the remaining structure by novel retaining means so designed that the valve or any of the removable parts cannot drop into the regulator casing while being removed.

A further object of this invention is to provide a pressure regulator in which the valve is made of relatively soft material which material will seat accurately and firmly, the seat being made of hard metal. By this construction the soft material of the valve may easily adapt itself to the hard metal seat and the soft material may be said to flow, to maintain an accurate and gas-tight fit.

Another object of the invention is to provide a regulator in which the valve and cooperating seat may be readily disassembled and detached from the remaining portion of the pressure regulator in order that these members may be either replaced or repaired in an expeditious manner.

Still another object of this invention is to provide a pressure regulator having a pressed steel cover therefor reinforced at its edges by being folded back upon itself to provide a rigid flange for cooperation with the gasket and the body of the regulator.

A further object of this invention is to provide a pressed steel cover as above-described to which cover is attached a novel and simple means for regulating spring pressure on the diaphragm.

These and other objects of the invention will be apparent from the following description and from the appended claims when taken in connection with the accompanying drawings wherein Figure 1 is a view looking into one embodiment of my improved regulator with the cover and diaphragm members removed and taken substantially along lines 1—1 of Figure 2.

Figure 2 is a sectional view taken substantially along line 2—2 of Figure 1, with parts thereof shown in elevation.

Figure 3 is a sectional view taken substantially on line 3—3 of Figure 1.

Figure 4 is a side elevation of the lever for operating the valve.

Figure 5 is a sectional view taken on line 5—5 of Figure 4.

Figure 6 is a side elevation of the valve member.

Figure 7 is a side elevation of the screw used to secure the valve to the lever arm.

Referring to the drawings wherein is shown one form of my improved pressure regulator, a main body 1 is provided, usually in the form of a casting with the walls 2 and 3 projecting outwardly from the bottom thereof to define a channel member in which channel is positioned the valve and its operating mechanism. The body portion 1 has an annular flange 4 with a series of holes 5 therein for the reception of clamping bolts 6 to secure the removable cover 7 in position and to also secure the diaphragm 8 to the body portion 1.

The cover 7 is made of pressed steel which is dished as shown, the marginal flange thereof being formed by bending the portion 11 back upon itself to provide a reinforced edge for the main cover 7 for clamping the diaphragm against the body 1. This bent-over edge provided a simple reinforced flange which will not cut or abrade the diaphragm clamped between the cover and the flange 4.

The diaphragm 8 includes the flexible portion 12 which is annular in shape and is clamped at its outer edge between the flange 11 of the cover 7 and the outer flange 4 of the body 1. In certain installations the diaphragm is made of treated sheep skin to add to the flexibility thereof and a diaphragm protector 13 made of empire cloth is clamped between the diaphragm and the cover 7. The inner portion of the flexible diaphragm 12 is supported between the two rigid pan members 14 and 15 which pan members are clamped against a shoulder on a reciprocating valve operating stem 16 by a lock nut 17 threaded on the end of bar 16, the lock nut clamping a packing washer 18 against the metal pan members 14 and 15, there being soft packing material interposed beneath the packing washer 18.

At the upper end of the body 1 is a threaded opening 22 for the reception of a correspondingly threaded inlet connection 23. A locking or dowel pin 24 is inserted through the inlet connection 23 and into a corresponding opening in a body 1 for retaining the inlet connection in set position. A restricted opening 25 passes through the inlet connection 23 into the body 1, a fine copper screen 26 being positioned at one end of the restricted opening 25 to prevent the entrance of any foreign matter into the regulator casing. An aluminum alloy washer 27 is interposed between the inlet connection 23 and the body of the valve casing 1 to provide a tight and permanent joint at this point.

Within the improved regulator casing 1 the inlet connection 23 terminates in a conical end through the center of which the restricted passage 25 passes. This conical end of the inlet connection 23 functions as the valve seat against which the regulator valve moves to close the opening 25.

Formed integrally with the back wall of the body portion 1 is a pair of spaced lugs or ears 28 perforated to receive pivot pin 28' supporting an operating lever 29, which is connected at one end to the reciprocating valve operating rod 16. This lever is shown in more detail in Figures 4 and 5. Lever 29 is enlarged at its valve operating end just above its pivotal connection 28'. This enlarged portion is provided with cylindrical recess 32 and with spaced arms 33 projecting outwardly from the lever. A bore 34 passes through the end of lever 29 opening at one end into the semi-cylindrical cavity 32, the bore 34 being screw threaded.

Our improved valve member proper, which is shown more fully in Figure 6, comprises a body portion 36 having a cylindrical extension 37 adapted to fit within recess 32 of lever 29. The extension 37 has a tapered bore 38 formed therein for the reception of a holding pin for securing the valve body 36 to lever 29. The valve member 36 has an opening 39 on one face thereof for the reception of a valve 40 secured to body 36 in any suitable manner and formed of relatively soft material, for example as rubber, fiber, or such white metal in order to seat securely and in a gas-tight manner against the conical end of the inlet connection 23 in operation of the device.

Valve member 36 is secured to lever 29 by means of an elongated pin shown in detail in Figure 7. This pin includes a head portion 42 having a slot therein for the reception of a screw driver, and tapered body portion 43 for reception in correspondingly tapered bore 38 of valve member 36, and a screw threaded portion 44 for cooperation with the threaded bore 34 of lever 29. This pin is further extended and has an elongated portion 45, the portion 45 of the screw being slightly smaller than the screw threaded portion 44 thereof and is of a diameter that will pass freely through the screw threaded bore 34 of the end of the lever 29. The elongated part 45 of the pin 44 is provided in order to prevent the pin and valve body 36 from falling down into the regulator casing when the valve is being changed, as will be described in detail later.

In order to disassemble the valve from the remaining regulator mechanism one wall 3 of the body portion 1 has a screw threaded opening to receive a plug 47. This screw threaded opening through the wall 3 is substantially larger than the valve and is in alignment with the pin 42. Therefore, if after use of the regulator, it is found necessary to either renew or repair the valve thereon, the plug 47 may be removed, the gas pressure of course having previously been cut off, and a screw driver may be inserted through the opening in the wall 3 to engage with the head 42 of the pin. Rotation of the pin will disengage the threaded portion 44 thereof and the pin will move outward, tapered section 43 being withdrawn from the tapered opening 38 in the valve member 36. As the pin is withdrawn, extension 45 thereof enters the screw threaded portion of the opening 34 of lever 29, so that when the complete screw threads are disengaged the valve and the screw will not fall down into the casing but on the contrary will be supported in a substantially horizontal position by extension 45 engaging with the walls of the opening 34. The entire valve with its screw may then be simply and easily removed from the casing by means of the operator's fingers or by means of pliers, and a new valve inserted. When the new valve is inserted, extension 45 of the pin is passed through tapered hole 38 of the valve and hole 34 of the lever acting as a guide. The threaded part of the pin is then screwed into hole 34 and tapered section 43 seats in hole 38 wedging the valve into proper position. It will be noted that the length of the pin is such that head 42 will be well in the opening for plug 47 before the end of section 45 is free from hole 34, thereby insuring against the pin dropping into the regulator body accidentally.

The pressure regulator as a whole is secured to a vertical wall by means of brackets 48 secured to the body 1 of the regulator by means of a bolt 49. The lower end of the body portion 1 is provided with a screw threaded opening 52 to which opening may be secured the low pressure gas main. It is customary to associate with a pressure regulator of the above described type, a device to act as a safety valve in case of excess pressure, said device usually comprising a liquid seal device. As shown in Figure 1, this liquid seal device comprises a depending removable outlet casing 53, provided with a central chamber 54, and a plurality of ports 55, for connection with low pressure gas mains. The ports 55 are adapted to receive a plug 56 so that one or a plurality of low pressure mains may be selectively associated with the regulator by means of the liquid seal device.

An annular chamber 57 is integrally formed with the body 53, and a pipe 58 is threaded into an opening 59 in the bottom of the central chamber 54, said pipe extending downwardly through the annular chamber 57 and out of an opening 61 in said chamber. A second pipe 62 slightly larger than pipe 58 and concentrically spaced therefrom, extends upwardly into annular chamber 57, terminating adjacent the upper wall thereof and is screw threaded into opening 61. The lower end of pipe 62 is closed by a cap 63, pipe 62 extending below the inner pipe 58. Pipe 62 has a plurality of perforations 64 therein adjacent the bottom of annular chamber 57, and chamber 57 has vent openings 65 therein. It will be noted from Figure 1 that the upper walls of the annular chamber 57 diverge outwardly and downwardly and that the lower walls thereof diverge outwardly and upwardly, with vertically disposed walls connecting said diverging walls. The vent openings 65 in chamber 57 are so disposed that they are spaced from the path of movement of liquid passing out of the liquid seal due to excess pressure. When the liquid is poured into the above described seal device it passes into the inner pipe 58 and upwardly into the annular space between pipe 58 and pipe 62. If the pressure becomes excessive the liquid is blown upwardly into the annular space between pipes 58 and 62 and into the annular chamber 57, said liquid impinging against the upper curved walls of said chamber and being deflected downwardly away from the openings 65. The liquid then trickles back into the liquid seal device through opening 64, and is not lost by being blown out of the seal device. It will accordingly be seen that our improved regulator is provided with a novel replaceable combination outlet and vent relief or seal member.

It is desirable that a pressure regulator of this type be provided with means to adjust the tension of the spring, on the diaphragm member. Our improved regulator includes as one of the novel features thereof, a new and simplified adjustment for the spring pressure in which pressed steel cover 7 has an opening 68 adjacent the bottom of said cover as seen in Figure 2, and also has a lug 69 which is bent at right angles and secured to said cover 7 by soldering or welding within the same and adjacent the opening 68. Said lug 69 has a threaded opening 71 in alignment with opening 68 in the cover 7, said opening 71 being threaded for the reception of a threaded adjusting pin 72. The opening 68 in the cover 7 is of such diameter as to provide a relatively close fit with the pin 72 to thus act as a bearing and guide for the reciprocation of pin 72 when the same is rotated.

Secured to the bottom of lug 69 is a leaf spring 73 which extends upwardly to the center of the pressure regulator and bears at one end against the reciprocating lever 16. This leaf spring thus normally tends to force pin 16 to the left as seen in Figure 1, in opposition to the pressure within the casing 1. The inner end of pin 72 has a stop member 74 thereon secured thereto by a headed screw or rivet 75. The stop 74 slides in frictional engagement with the cover 7, on one side and with spring 73 on the other side. Rotation of pin 72 by a screw driver or otherwise will move stop 74 inwardly or outwardly due to the screw threaded opening 71 in bracket 69, which will have the effect of lengthening or shortening the effective length of spring 73 which acts on the pin 16. In order to increase the effective strength of the spring 73 on pin 16, the rotatable pin 72 is screwed inwardly thus shortening the effective length of spring 73 and increasing the pressure within casing 1. When a lower pressure is desired within casing 1 the pin 72 is rotated in the reverse direction to move stop 74 downwardly as seen in Figure 2, thus weakening the effective strength of spring 73.

The above described method of adjusting the spring tension on the diaphragm is very simple and compact. The depth of the regulator is not increased due to the spring adjustment means and the adjustment may be simply and accurately accomplished. If desirable, pressure indicia may be marked on the reciprocating pin 72, which indicia will cooperate with the edge of the cover 7 adjacent opening 68 therein to form an accurate indicator as to the pressure of gas within the casing.

The operation of the above described regulator is as follows: The inlet connection 23 is connected to the source of gas pressure, such as a sealed cylinder containing gas under high pressure, and the liquid seal device 53 is provided with the proper amount of sealing liquid, such as mercury, or the like. Adjusting screw 72 is moved in or out to provide the proper gas pressure on the low pressure main, and said low pressure mains are connected to ports 55 of casing 53. By the provision of plug 56, one or more pressure lines may be associated with and regulated by the single pressure regulator. The regulator is mounted as shown in Figures 1 and 2 by means of the brackets 48 which may be secured to any suitable support by screws or other fastening means, passing through the perforated ends of said brackets. When the gas is turned on into connection 23, the valve 36 is forced from its seat to allow gas to enter chamber 1. The diaphragm structure is thus moved upwardly to take a position in accordance with the pressure of the spring 73 thereon, to provide a constant and uniform pressure in the low pressure main or mains connected to ports 55. The pin 72 may be adjusted inwardly or outwardly by means of a screw driver, the indicia thereon serving as a guide in cooperation with the cover to indicate the varying spring pressure on the pin 16 of the diaphragm structure. As the pin is turned inwardly the stop 74 moves inwardly to shorten the effective length of spring 73, and vice versa.

The soft material valve 40 cooperates with the projecting conical end of the inlet conduit 23 to shut off or open flow through restricted passage 25. Due to the fact that the conduit 23 is relatively hard material, the valve member 40 always accurately seats on the member 23, since the relatively soft material can flow to adjust itself to an accurate seat. In regulators where both the valve and the seat are of relatively hard metal, the members must be accurately ground into engagement to provide an accurate and gas-tight seat. After relatively short periods of use this accurate adjustment of the valve and seat is lost, due in part to the great number of times the valve must open and close, and due to the fact that the usual gas contains slight quantities of foreign matter which corrode the valve and the valve seat, causing pitting thereof, whereby the valve cannot seat accurately.

If for any reason, after the device has been installed it becomes necessary to renew or repair valve parts, it is only necessary to close off the valve, not shown, which severs entrance of gas under high pressure, remove plug 47 from the casing 1, and the valve can be removed. By inserting a screw driver through the opening provided by removal of plug 47, the pin 42 may be rotated in a reverse direction to disengage portion 44 thereof from the threaded opening 34 of the lever 29. As the screw threaded portion 44 of the pin 42 leaves the threaded opening 34, the elongated end 45 of said pin enters the threaded bore 34, and head 42 enters the opening for plug 47 so that when the threads are completely disengaged the valve 36 and the pin 42 cannot fall down into the regulator casing, since portion 45 of the pin will act as a support for the valve to hold the same in a substantially horizontal position. The workman can then merely reach into the casing with his fingers or with pliers and remove the valve and its associated pin from the casing, and the valve 40 thereof may be either replaced or repaired. If it is found necessary to grind the seat on the entrance conduit 23, this member may be easily removed from the regulator casing by disconnecting the high pressure main therefrom, removing lock pin 24, and screwing the connection 23 outwardly. The screen 26 serves to prevent the entrance of foreign matter into the casing to thereby interfere with the accuracy of the regulator.

The sheepskin flexible diaphragm 12 is protected from cutting at its edges by the empire cloth 11. By the provision of the steel cover 7 having its edge 11 bent back upon itself to provide a rigid flange, the sheepskin diaphragm 12 is not cut by any sharp or ragged edges, and the cover is sufficiently rigid and strong to withstand any strain placed thereon, and to act as a guide for the reciprocating stop 74 on 72.

The improved regulator as above described, is greatly simplified in its construction and yet is extremely accurate and durable in use. Due to the simple and novel means shown for removing the valve mechanism from the casing it is not necessary to disassemble the mechanism as a whole in order to service the regulator, and the diaphragm need never be disturbed after having once been clamped in position between the pressed steel cover 7 and the casing 1.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:—

1. In a pressure regulator, a movable valve mechanism including a lever, a threaded opening therein, a removable valve member adapted to be secured to said lever, an unthreaded conical bore through said valve member, and a pin for securing said valve member to said lever, said pin having a conical portion for engagement with the conical bore of said valve member and having a threaded portion for engagement with the threaded opening of said lever.

2. The invention as defined in claim 1 wherein said lever has a curved socket thereon, and said valve member has a correspondingly curved portion for engagement in said socket, the bore in said valve passing through the curved portion thereof.

3. The invention as defined in claim 1 wherein said pin has an elongated extension beyond the threaded portion thereof, said extension being of such diameter as to pass freely through the threaded opening in said lever.

4. The invention as defined in claim 1 wherein said valve mechanism is positioned within a closed regulator casing, and a normally closed opening in said casing adjacent said removable valve member whereby said valve member may be detached from said lever and removed from said casing through said opening.

5. The invention as defined in claim 1 wherein said valve mechanism is positioned within a closed regulator casing, a normally closed opening in said casing adjacent said removable valve member, an elongated extension on said pin beyond the threaded portion thereof of such diameter to pass freely through the threaded opening in said lever, whereby said valve member may be detached from said lever and removed from the casing through said opening and said extension will support said valve member to prevent dropping the same into the casing.

6. A pressure regulator for gas comprising a cast metal casing having an open side, an inlet and an outlet for the gas, a valve for controlling the inlet of gas, an outstanding flange on said casing, a diaphragm for operating said valve, and a pressed steel cover closing the open side of said casing and clamping the diaphragm between said cover and said outstanding flange, said cover has a flange bent back upon itself for engagement with the flange on said casing.

7. The combination with a pressure regulator for low pressure gas including a casing, an outlet connection therefor, a diaphragm, and an inlet valve operatively connected to said diaphragm, of a combined liquid seal device and outlet connection connected to said regulator, said device including a plurality of low pressure taps whereby one pressure regulator may be connected to one or more low pressure pipes by the liquid seal device.

8. The combination with a pressure regulator for low pressure gas including a casing, an inlet connection, a diaphragm, an inlet valve operatively connected to said diaphragm, and a single outlet for said casing, of a liquid seal device secured to the outlet of said casing comprising a chamber, a liquid seal in communication with said chamber, and a plurality of low pressure taps in communication with said chamber.

9. A pressure regulator comprising a closed casing, a diaphragm therein, a lever mechanically connected to said diaphragm, an inlet connection, a valve for controlling flow through said inlet connection, a pin removably securing said valve to said lever, and a normally closed opening in said casing adjacent said pin whereby said pin and valve may be disconnected from said lever and removed from the casing without removing the lever or diaphragm, said pin having a shank passing through an opening in said valve and said lever, said shank being of such length as to support said valve from the lever to prevent dropping of the same into said casing.

10. A pressure regulator comprising a closed casing, a diaphragm therein, a lever mechanically connected to said diaphragm, an inlet connection, a valve for controlling flow through said inlet connection, a pin removably securing said valve to said lever, and a normally closed opening in said casing adjacent said pin whereby said pin and valve may be disconnected from said lever and removed from the casing without removing the lever or diaphragm, said pin being provided with a threaded portion with unthreaded portions on each side thereof the threaded portion engaging a correspondingly threaded opening in said lever.

11. A pressure regulator comprising a closed casing, a diaphragm therein, a lever connected to and operable by movements of said diaphragm, an inlet connection, a pin having threads thereon throughout a portion of its length, a valve member having an opening through which a portion of said pin may freely pass, said lever having a threaded opening for engaging the threaded portion of said pin, said pin projecting beyond the threaded opening of the lever to thereby support the pin and valve member from the lever by engagement with the opening in the lever after the threaded portion of the pin has been unscrewed.

ALLEN D. MacLEAN.
CHAS. B. JOHNSON.